United States Patent [19]

Anderson et al.

[11] Patent Number: 5,548,669

[45] Date of Patent: Aug. 20, 1996

[54] OPTICAL FIBER LIGHT CONE SWITCH

[75] Inventors: Mark V. Anderson; Daniel J. Mulally, Both of Rapid City, S. Dak.

[73] Assignee: Wireless Control Systems, Rapid City, S. Dak.

[21] Appl. No.: 541,025

[22] Filed: Oct. 11, 1995

[51] Int. Cl.$^6$ .................................................. G02B 6/35
[52] U.S. Cl. .................................. 385/19; 385/16; 385/15
[58] Field of Search .................................. 385/19, 16, 17, 385/18, 15

[56] References Cited

U.S. PATENT DOCUMENTS 5,133,030  7/1992  Lee ............................................. 385/19

*Primary Examiner*—Rodney Bovernick
*Assistant Examiner*—Phan T. H. Palmer
*Attorney, Agent, or Firm*—John R. Duncan; Frank D. Gilliam

[57] ABSTRACT

A light cone switch for use in an optical switch system that includes an optical fiber having a first end into which light is directed and a second end that emits light along a diverging path. A light reflector is positioned along this path and is movable toward and away from the second fiber end along the fiber axis. More light is reflected into the fiber when the reflector is near the second end than when it is moved away from that end. A light detector at the first fiber end receives light reflected into and through the fiber and reacts differently to the receipt of high and low light levels. Typically, these different received light levels can be used to turn electrical lights on and off, start and stop motors, control variable devices such as dimmers, etc.

20 Claims, 2 Drawing Sheets

OPTICAL FIBER LIGHT CONE SWITCH

BACKGROUND OF THE INVENTION

This invention relates in general to fiber optic switches and, more specifically, to a novel light cone switch for use in remote switching systems using a single fiber or a thin bundle of fibers to carry the switching signal.

Conventionally, switches having at least two insulated metal wires are used to connect switches to electrical devices, such as lights, motors, fans, heaters or the like, to allow the device to be turned on and off.

Use of conventional electrical wiring and electrical switches can be hazardous in a number of environments. For example, around swimming pools, spas, whirlpool tubs and the like, where the users are immersed in water and may operate electrical switches with wet hands a serious shock or electrocution hazzrd can exist. Also, corrosion and rusting of the switches and wiring is likely.

Electrical wiring and switches are also subject to corrosion problems when used on boats or in other marine applications. Further, electromagnetic interference may be produced by the operation of radar units and other electronic devices interacting with electrical wiring and electrical switches.

In hazardous or explosive environments, such as oil refineries, natural gas plants, grain elevators, mines, etc., electrical switches and wiring may produce sparks causing fires or explosions. Further, electrical switches designed for use in wet or hazardous environments tend to be expensive, heavy and bulky resulting in large, expensive control panels and the like. Electrical cables often require heavy insulation and shielding in such environments, making installation costly and difficult.

In new building construction, electrical wires are extended through walls, requiring cutting holes through studs, and threading the wires therethrough. There is always a danger that someone, during construction or later, may insert screws or nails into the wall, drill holes, etc. and contact the wires, resulting in electrical shock and fire hazards.

In remodeling of rooms or adding new electrical devices, adding switches with insulated metal wires between the new switches and devices is expensive and difficult, requiring fishing wires through holes in studs behind existing, covered, walls. In some cases, switches are desired on thin partition walls or solid masonry walls where the wiring cannot be hidden. The use of surface mounted wires or loose extension cords is both visually undesirable and a safety hazard.

Recently, a number of small hand-held remote controls using a radio frequency or infrared signal sent to a receiver at the device to be controlled have been developed. These are very effective in a number of applications, such as the control of audio or video entertainment equipment. They are, however, less successful in applications such as the control of room lights and similar permanent devices. These remote controls require batteries that must be replaced periodically and they cannot be allowed to get wet and often cannot be used in hazardous environments.

In an effort to overcome these problems with remote electrical switches using metal, current carrying, wiring, the use of fiber optics has been proposed. Speers, in U.S. Pat. No. 4,023,887 discloses complex switching systems using cables each made up of a plurality of parallel optical fibers to carry various signals. While these cables may be laminated to walls, it is apparent that the size of the cables will result in obvious, obtrusive strips across the wall, since at least two optical fibers are needed between each switch and controlled device. Similarly, Matsunaga et al, in U.S. Pat. No. 4,705,348 discloses an optical switch using two optical fibers between a complex switch and the device being controlled. The reflector used by Matsunaga et al would require very precise alignment of the fiber ends and the reflector and careful orientation and polishing of the fiber ends to be certain that sufficient light entering from one fiber is reflected into the other.

Others, such as Narondy in U.S. Pat. No. 3,886,544 and Ho et al in U.S. Pat. No. 4,797,549 describe systems which simply interpose a blocking or reflecting member into a break between two coaxial optical fibers to selectively block or permit light passage. These techniques require highly polished fiber ends, cut precisely 90° to the fiber axis and careful alignment of the fiber ends to allow sufficient transfer of light from one fiber to the other.

In U.S. Pat. No. 5,163,112, assigned to the assignee of this application, is described an improved remote switch system using a single optical fiber, or a very thin optical fiber bundle, running between an electrical device to be controlled and a remote location. A light emitter and a light detector are located at the device end of the fiber and a movable retro reflector is located at the remote location. A pulse of light could be sent to the device by rotating the retro reflector from a position out of alignment with the fiber end, through an aligned position that would reflect light back into the fiber to a second out of alignment position. While highly effective, this optical switching system requires means for rotating the retro reflector into and out of position at the end of the fiber. Also, this system is not capable of gradually varying the light level sent back through the fiber.

Thus, there is a continuing need for improved switches and switching systems for switching light signals in fiber optic systems to switch various devices between states, that can be safely used in wet, corrosive or hazardous environments and that have greater reliability, compactness and simplicity than prior non-wired systems.

SUMMARY OF THE INVENTION

The above-noted problems, and others are overcome by the switching system of this invention which basically includes a light reflecting surface spaced from an end of an optical fiber or thin optical fiber bundle that emits light along a conical path. The surface is movable toward and away along the fiber axis from the end to vary the percentage of the light emitted by the fiber end reflected back into the fiber end. The light reflected back into the fiber travels to the opposite end, where detector means detects the light level and causes an operation to occur (such as turning a light, motor or the like on or off) depending on whether a high or low light level or change in light level is detected.

Light emitted from an end of an optical fiber travels along a divergent path. The shape of this divergent path depends on the shape of the fiber end, with a circular fiber having a flat end surface perpendicular to the fiber axis producing a right circular cone and other shapes producing broad or narrow cones, having cross sections corresponding to the cross sectional shape of the fiber end and angled ends producing oblique cones. All of these diverging paths are considered to be "cones" for the purposes of this application.

A flat reflector close to the fiber end will reflect most of the emitted light back into the fiber, while the same reflector spaced further from the fiber end will reflect a much smaller proportion of the emitted light back into the fiber. A relatively small movement of the reflector will make a significant change in the returning light intensity in the fiber so that a conventional detector will easily distinguish the two levels. If desired, a stepwise change in return light intensity can be effected by stepwise movement of the reflector between close and distant positions to the fiber end so that step functions, such as control of a room light dimmer, may be accomplished.

Similarly, a concave reflector, typically having a large radius, properly spaced from the fiber end will reflect most light back into the fiber while a convex reflector will reflect most light away, greatly changing light intensity returning to a detector at the second end of the fiber. The concave surface may have a planar central area, if desired. Excellent results are obtained with tactile metal or plastic dome-shaped surfaces in which the convex exterior is pressed, causing a "snap action" moving the concave inside surface toward the fiber end.

Dimmer and variable speed control can be also be achieved with the light cone switch. Utilizing a timer in the electronics from the detector output, the switch can be pushed and held down to dim, then released, and later pushed down and held again to brighten. Alternatively, dimmer and other variable control can be achieved as a function of the distance of the reflector from the end of the fiber. Since varying light levels are reflected back through the fiber to the detector depending upon how close the reflector is to the fiber, continuous control can be achieved by simply varying pressure on the switch.

It is, therefore, an object of this invention to provide a remote electrical switch system overcoming the above noted problems. Another object is to provide a remote switch of improved simplicity and compact size. An additional object is to provide a system in which the state of an electrical device may be changed from any of a number of remote sites. Another object is to provide a remote switching and control system having no electrical connection to the remote switch. A further object is to provide a remote switch that can safely be used in wet, hazardous or explosive conditions.

Typically, the electrical device being controlled by the light switch system described above may be an electrical light heaters, fans, motors or the like. These devices could be turned on and off, or further stepped changes could be caused, such as varying light brightness (similar to a conventional dimmer), fan speed could be gradually increased or decreased, etc. Variable devices could also be controlled by measuring changes in reflected light intensity.

The switch system uses a movable reflective surface aligned with the fiber end. The reflector alignment need not be precise but must reflect varying light levels back to the fiber end as the surface is moved toward and away from the fiber end. For optimum results, the surface should be maintained approximately perpendicular to the fiber end throughout movement. As the surface moves toward and away from the fiber end a change in intensity is reflected back into the fiber to the device location where conventional control means changes the state of the device, such as between "off" and "on". A number of different detector controlled electrical switches may be used, each capable of reversing or otherwise changing the device state.

While a single, thin optical fiber is preferred, a thin bundle of substantially parallel fibers could be used if desired. For the purposes of this invention, "optical fiber means" includes both a single fiber optic strand, or a bundle of such strands. In either case, with the emitter light signal passing in one direction and the returning signal to the detector passing in the same fiber allows the single fiber or bundle to be extremely thin, much thinner than would be possible with a bundle in which different fibers carry the signals passing in opposite directions.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
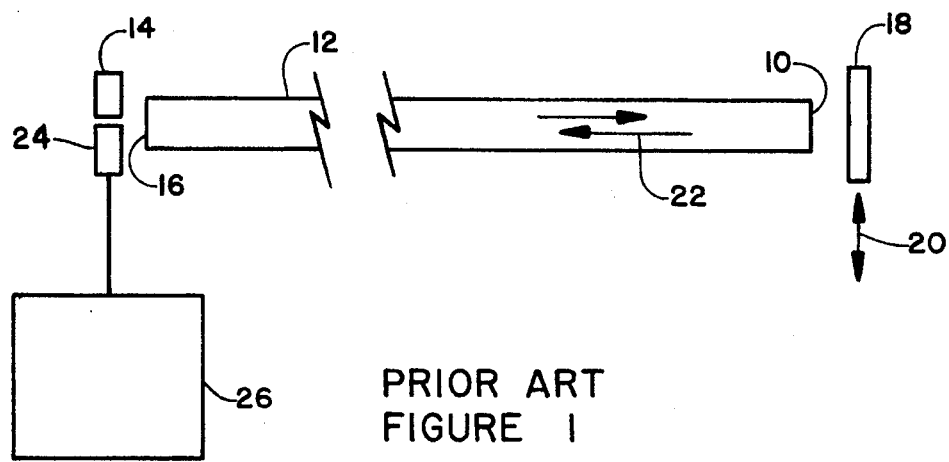
FIG. 1 is a schematic elevation view of a prior art optical switch.

FIG. 1 shows a conventional optical switch for varying the amount of light reflected back into a first end 10 of a fiber optic 12. An emitter 14, typically a light emitting diode, directs light into the second end 16. Light from emitter 14 travels through fiber optic 12 and exits first end 10.

A flat reflector 20 is movable as indicated by arrow 18 along the plane of the reflector between two positions, a first position adjacent to, and closely spaced from, end 10 and a second position below and away from fiber end 10. In the first position, a large portion of the light exiting fiber end 10 is reflected back into fiber optic 10 and travels, as indicated by arrow 22 to a light detector 24. When light is received at detector 24 a signal is generated to cause a device 26 to change state, such as turning a device on. Typically, an electrical switch at device 26 is actuated to turn on a light, a motor, or other mechanism. When reflector 18 is slid away from fiber end 10, the emitted light dissipates and none is reflected back into optical fiber 12, so that less light is received at detector 24, causing the detector to switch device 26 to the opposite state, typically off.

Figure 2:
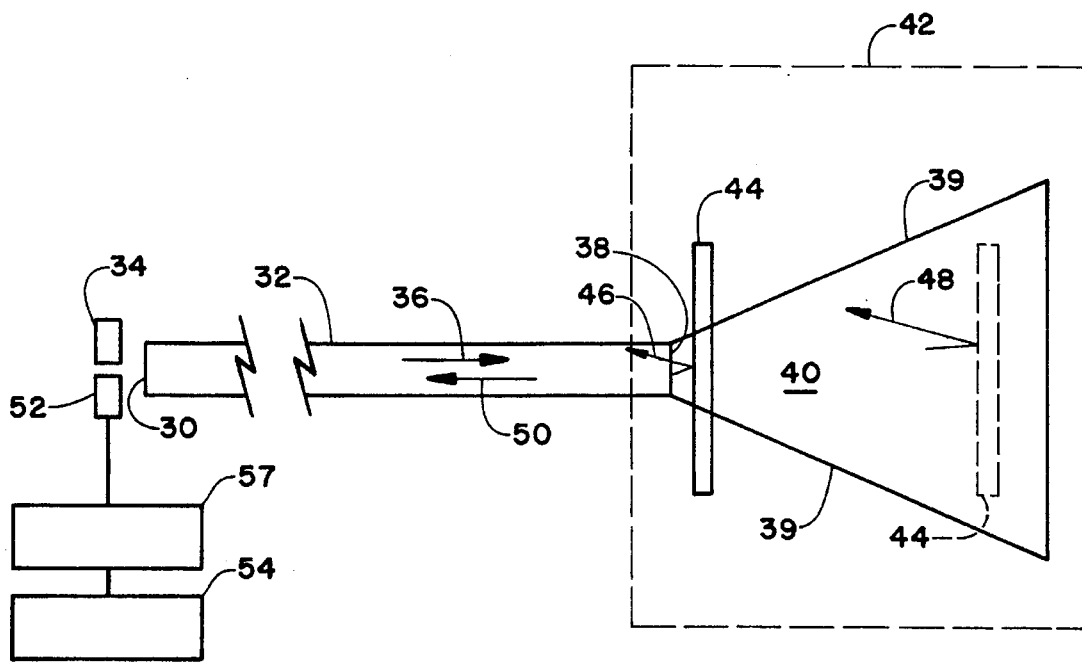
FIG. 2 is a schematic elevation view of the optical switch system of this invention using a planar reflector.

A first embodiment of the improved optical switch of this invention is schematically represented in FIG. 2.

Light is introduced into first end 30 of optical fiber by a light source 34, typically a light emitting diode. Light moves through fiber 32 in the direction indicated by arrow 36. The light then leaves second end 38 in a diverging conical pattern represented by area 40 between lines 39. The switch area is schematically indicated by boxed area 42.

Switching is accomplished by moving reflector 44 between the positions shown in solid lines and that shown in broken lines in a direction axial to the divergent, conical area 40. Light within the central area of reflector 40 is reflected by reflector 40 in the position near to end 38 back into fiber optic 32, as indicated by light ray 46, while light reflected by reflector 40 in the position further from end 38 diverges as shown by light ray 48. Thus, it is apparent that a greater proportion of the light leaving end 38 will be directed back into fiber 32 when reflector 40 is close to the fiber end than when the reflector is further away.

Any suitable reflecting surface may be used. In general, a flat polished metal, metalized plastic, etc. surface is very effective. The entire surface may be reflecting, or only a central area, as desired. Alternately, small retroreflectors, typically retroreflecting beads of the sort sold by the 3M Co. under the Scotchlite trademark, molded small cube-corner reflector patterns, etc., may be used over a portion of the reflecting surface to maximize the change in reflected light.

The light directed back into fiber 32 passes through the fiber in the direction indicated by arrow 50 to detector 52. The detected light signal is processed in electronics section 57 as desired to amplify the signal, operate a relay or solid state switch, etc., then passed to the electrical device 54 being controlled. Detector 52 is conventionally calibrated to cause device 54 to change from one state to another when light received at the detector passes an intensity threshold between that produced at each of the two reflector positions. Typically an electric switch, relay or triac controlling a light, motor or the like will be turned on when the light intensity moves above a threshold and turned off when the light intensity drops below the threshold. Alternately, the device will respond to a change in reflected light level received by the detector.

For purposes of illustration in the schematic representation of FIG. 2, the reflector is shown as movable between a position well away from end 38 and a close position. With very thin fibers, generally the near position of reflector 44 will be very close to or touching end 38 and the far position will be only a slightly greater distance. Typically, reflector movement will be over a distance of about 0.5 mm for thin, typically less than 1 mm diameter fibers. Reflector 44 can be moved between the two positions by any suitable straight-line moving means, such as a push-button switch or tactile metal dome.

Figure 3:
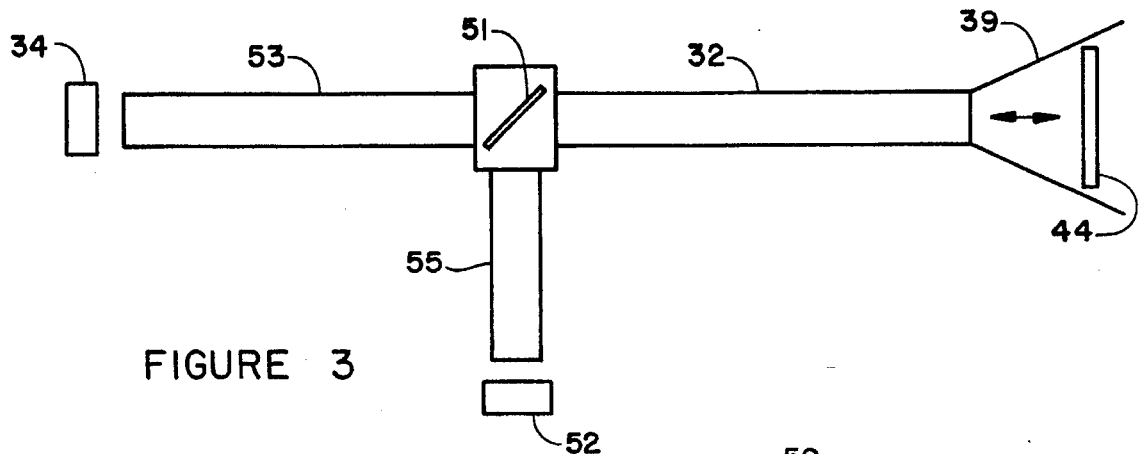
FIG. 3 is schematic elevation view of an embodiment of the optical switch system using a divided optical fiber.

While positioning emitter 34 and detector 52 very close together at the end of fiber 32 is often preferred, in an alternate embodiment shown in FIG. 3, a conventional beam splitter 51 could be placed at the emitter/detector end of fiber 32, passing light from emitter 34 into fibers 53 and 32 and reflecting light leaving fiber 32 into fiber 55 to a detector. Alternatively, conventional couplers or dividers may be used to divide the fiber optic means into two fibers, one going to the emitter 34 and the other to the detector 52. Any other suitable emitter/detector optical system may be used, as desired.

Figure 4:
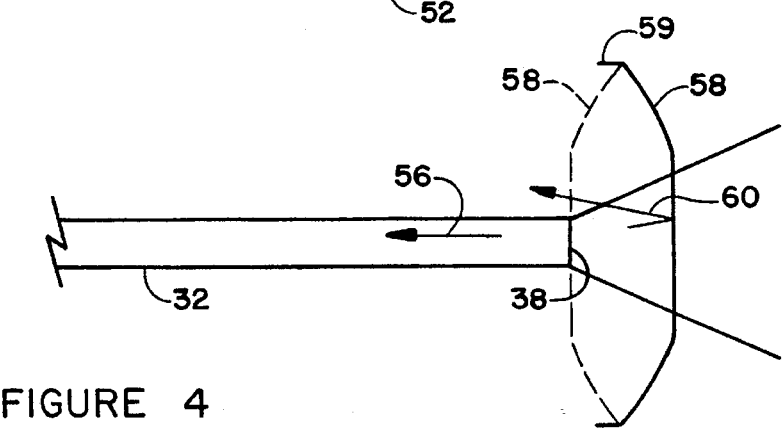
FIG. 4 is a schematic elevation view of an optical switch system using a snap action reflector.

FIG. 4 shows a second embodiment of the switch means, corresponding to the portion of FIG. 2 within the area 42. Here a snap-action tactile dome membrane type switch is used. The switch membrane 58 at rest has a slightly domed configuration as shown in solid lines. Typical such domed snap-action disks have a concave interior surface and may have a generally flat central area and a curved edge area with a small flange 59. When pressed, the dome becomes less concave (in some cases, may become flat or convex) and moved toward end 38 of fiber 32. The movement of membrane 58 is exaggerated for clarity, since in many cases only a slight movement is sufficient. Thus, when the switch membrane is pressed, the interior reflective surface is moved closer to end 38 so that a greater proportion of light leaving end 38 is reflected back into the fiber, triggering a detector as seen in FIG. 2. Typical light ray 56 will be reflected back into fiber 32, while a slightly off-center ray 60 will be reflected away from fiber end 38. Releasing membrane 58 allows it to snap back to the position shown in solid lines, reducing the proportion of the light leaving end 38 that is directed back into the fiber.

Such snap action switches are particularly useful where panels or arrays of switches and fiber optic connections are used, since these switches can be made in various sizes, down to about 3/16 by 3/16 inch and can be adhesively mounted on a panel in any desired arrangement, with the fibers exiting through the panel behind the switches. Since there is no electricity in this switch, they can be closely spaced and may be used in wet, hazardous or explosive environments.

Membrane 58 can be mounted in a shallow box-like housing, typically rectangular or circular, resembling a conventional electrical switch, with a hole for admitting fiber 32 into the housing. The housing can be easily sealed against the entrance of dust, moisture or other contaminants.

Figure 5:
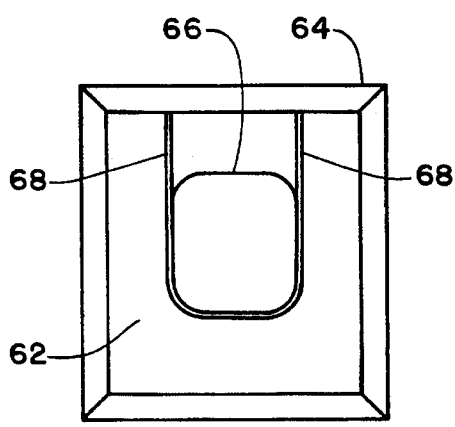
FIG. 5 is a schematic plan view of an optical switch system using a flexible reflector mount.
Figure 6:
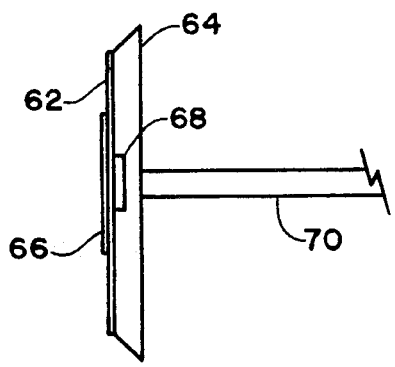
FIG. 6 is a schematic elevation view of the optical switch system of FIG. 5.

FIGS. 5 and 6 show a third embodiment of the optical switch of this invention. A thin sheet 62 of material, typically a stiff plastic such as ABS plastic, is held in a frame 64. A central pad 66 is provided on the outer surface of sheet 62 and a small reflective surface 68 is provide on the inner surface of sheet 62 opposite pad 66. A pair of slits 68 are formed through sheet 62 adjacent to pad 66 to permit the pad to be pressed and deflected, with the springy plastic material returning the pad to the original position when released. When pad 66 is pressed, reflector 68 is moved toward the end of fiber optic. The change in distance of the reflector 68 and the fiber end will vary the proportion of light directed back into the fiber, to cause a detector at the far end of fiber 32 to operate in the same manner as discussed with respect to the other two embodiments as detailed above.

This switch has an attractive appearance, generally similar to a conventional electric push-button switch. It can be attached to any suitable surface with adhesive or screws, with the sheet 62 covering the attachment screws and be secured to frame 64 after the switch is mounted.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A light cone optical switch system which comprises:

an optical fiber having at least one first end and a second end and a longitudinal axis;

emitter means for directing light into said first end of said optical fiber;

said second end shaped so that exiting light travels along a diverging path;

light reflector means adjacent to said second end of said optical fiber movable toward and away from said second end in a direction generally along said axis of said optical fiber to direct a variable proportion of light exiting said second end back into said second end; and light detector means for receiving light exiting said at least one first end and responding to differences and variations in received light intensity.

2. The optical switch system according to claim 1 wherein a single first end is provided and said emitter means and detector means are closely spaced and adjacent to said first end.

3. The optical switch system according to claim 1 wherein said optical fiber adjacent to said first end is divided into two fibers and said emitter and said detector are each adjacent to ends one of said two fibers.

4. The optical switch system according to claim 1 wherein said light reflector is substantially planar.

5. The optical switch system according to claim 1 wherein said light reflector has a curved surface movable between a predetermined concave configuration and a less concave configuration.

6. The optical switch system according to claim 5 wherein said light reflector is dome-shaped and is formed from a material selected from the group consisting of metal and plastics.

7. The optical switch system according to claim 1 wherein said light reflector comprises a reflecting surface on a springy flexible sheet so that said sheet may be manually pressed to move said reflecting surface toward said second end and released to move away by elastic forces.

8. The optical switch system according to claim 7 further including at least one slot cut through said flexible sheet adjacent to said reflecting surface forming a flexible tab around said reflecting surface.

9. The optical switch system according to claim 1 wherein said light reflector means comprises a smooth light reflecting surface.

10. The optical switch system according to claim 1 wherein said light reflector means comprises a retroreflecting material covering part of said reflector.

11. In an optical switch system which comprises a first optical fiber having first and second ends, emitter means for directing light into said first end of said optical fiber, means for permitting light passing along said optical fiber from said first end to leave said second end, switch means for reflecting a variable portion of light leaving said second end back into said second end and detector means at said first end for detecting light reflected back into said second end, the improvement wherein:

said switch means comprises a light cone switch having a light reflector means adjacent to said second end of said optical fiber movable toward and away from said second end in a direction generally along said axis of fiber to direct a variable proportion of light from said first optical fiber end exiting said second end back into said second end.

12. The improvement in an optical switch system according to claim 11 wherein said light reflector comprises a reflecting surface on a springy flexible sheet so that said sheet may be manually pressed to move said reflecting surface toward said second end and released to move away by elastic forces.

13. The improvement in an optical switch system according to claim 12 further including a pad of stiff material on a surface of said flexible sheet opposite said reflecting surface.

14. The improvement in an optical switch system according to claim 13 further including at least one slot cut through said flexible sheet adjacent to said reflecting surface forming a flexible tab around said reflecting surface.

15. The improvement in an optical switch system according to claim 11 wherein said light reflector is substantially planar.

16. The improvement in an optical switch system according to claim 11 wherein said light reflector has a curved surface movable between concave and convex with an approximately planar central area.

17. The improvement in an optical switch system according to claim 11 wherein said light reflector means comprises a smooth light reflecting surface.

18. The improvement in an optical switch system according to claim 11 wherein said light reflector means comprises an area of retroreflecting material.

19. The improvement in an optical switch system according to claim 11 further including coupling means at said first end of said first optical fiber for dividing said fiber into second and third optical fibers, with said emitter means at an end of said second optical fiber and said detector means at an end of said third optical fiber.

20. The improvement in an optical switch system according to claim 19 wherein said coupling means is a beam splitter for directing at least part of light received from said emitter and second optical fiber into said first optical fiber and for directing at least a part of light received from said first optical fiber into said third optical fiber.

* * * * *